United States Patent [19]

Ishii

[11] Patent Number: 4,866,558
[45] Date of Patent: Sep. 12, 1989

[54] CIRCUIT BREAKER

[75] Inventor: Kazuhiro Ishii, Fukuyama, Japan

[73] Assignee: Mitsubishi Denki Kabushiki Kaisha, Tokyo, Japan

[21] Appl. No.: 288,869

[22] Filed: Dec. 23, 1988

[51] Int. Cl.$^4$ ............................................... H02H 3/08
[52] U.S. Cl. ....................................... 361/96; 361/86; 361/94; 340/662
[58] Field of Search ....................... 361/86, 91, 93–98; 340/662

[56] References Cited

U.S. PATENT DOCUMENTS

| | | | |
|---|---|---|---|
| 4,224,651 | 9/1980 | Allen et al. | 361/97 X |
| 4,347,541 | 8/1982 | Chen et al. | 361/97 X |
| 4,763,220 | 8/1988 | Belbel et al. | 361/93 X |

Primary Examiner—Todd E. DeBoer
Attorney, Agent, or Firm—Burns, Doane, Swecker & Mathis

[57] ABSTRACT

A time delay circuit of a circuit breaker has: a comparator (35) for comparing an input signal (Ex) and a reference value (Ey) and for switching on and off for charging of a capacitor (38); a reference voltage setting circuit (37) for setting the reference voltage (Ey) corresponding to a value of a rated current of an A.C. power line; a processing circuit (45) for calculating a ratio of the input voltage (Ex) corresponding to a value of overcurrent to the reference voltage (Ey); and a voltage/current conversion circuit (44) for converting an output voltage of the processing circuit (Ez) to a current output (Ib) which is to be charged in the capacitor (38) for determining a delay time.

6 Claims, 7 Drawing Sheets

CIRCUIT BREAKER

FIELD OF THE INVENTION AND RELATED ART STATEMENT

1. Field of the invention

The present invention relates to a circuit breaker having an overcurrent tripping apparatus.

2. Description of the related art

In a conventional circuit breaker, for example, shown in Japanese Published Unexamined Patent Application Sho 60-32211 or Japanese Published Examined Utility Model Application Sho 55-29931, when a load break switch is closed, electric power is supplied to a load from terminals of an electric power source by passing through the load break switch. In such a condition, when an accidental overcurrent flows on an A.C. power line, a current transformer provided on the A.C. power line detects the accidental overcurrent and induces a secondary current which has a value in proportion to the value of the accidental overcurrent with a predetermined current transformation ratio of the current transformer.

The secondary current of the current transformer is input to a signal conversion circuit for being converted to predetermined signals. Output signals from the signal conversion circuit is input to a processing circuit. When the processing circuit determines that value of the accidental overcurrent is above a predetermined level, the processing circuit outputs a level detection signal to a time limiting circuit. The time limiting circuit executes time delay operation on the basis of the level detection signal, and outputs a trigger signal to, for example, a thyristor for exciting a tripping coil of a release-type overcurrent tripping apparatus. Thereby, the A.C. power line is broken by opening of the above-mentioned load break switch.

Figure 6:
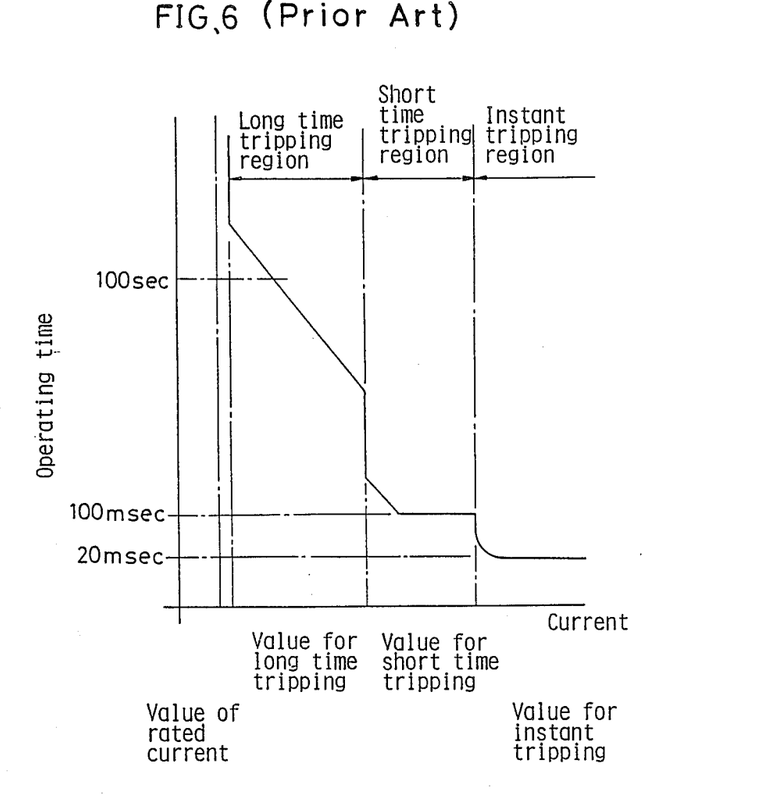
FIG. 6 is a drawing showing tripping characteristic of the conventional circuit breaker.

The time limiting circuit comprises an instant time tripping circuit, a short time tripping circuit and a long time tripping circuit respectively operating the time delaye when the electric current flowing on the A.C. power line is above an instant time tripping region, a short time tripping region and a long time tripping region shown in FIG. 6.

Figure 7:
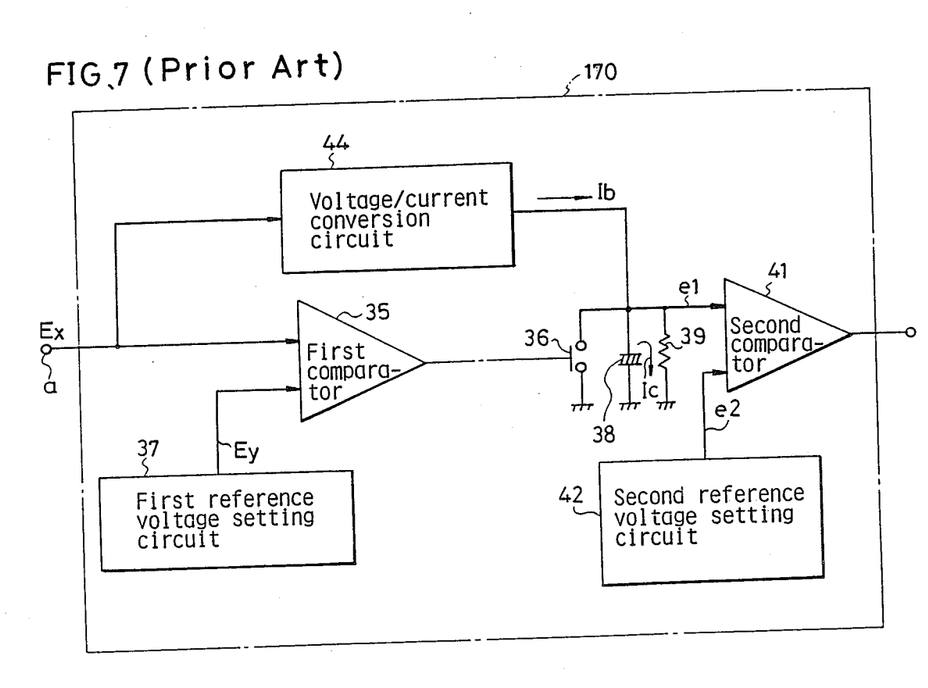
FIG. 7 is a circuit diagram showing the conventional long time tripping circuit of the circuit breaker.

FIG. 7 shows a conventional long time tripping circuit. Voltage of the level detection signal which corresponds to the value of the accidental overcurrent is converted to an effective value by an effective value conversion circuit. After that, an output voltage Ex of the effective value conversion circuit is input to a comparator 35 of a long time tripping circuit 170. A reference value corresponding to a value of the rated current of the A.C. power line is set by a reference voltage setting circuit 37. When the output voltage Ex reaches to a value which is two times as large as the reference voltage Ey, an output switch 36 of the comparator 35 turns off from switch-ON state. Thereby, a capacitor 38 becomes capable to be charged.

When the value of the rated current flowing on the A.C. power line is, for example, 200A, the reference voltage Ey of the reference voltage setting circuit 37 is, for example, set as 0.5V. Hereupon, when the output voltage Ex from the effective value conversion circuit reaches to 1V which is two times as large as the reference voltage Ey, the output switch 36 of the comparator 35 turns off from the switching on state. As a result, the capacitor 38 starts to be charged. In this case, the value of the accidental overcurrent flowing on the A.C. power line at the start of charging of the capacitor 38 is 400A.

On the other hand, the output voltage Ex of the effective value conversion circuit, which is to be applied to the input terminal "a" of the long time tripping circuit 170, is also input to a voltage/current conversion circuit 44. And the voltage/current conversion circuit 44 outputs an output current Ib corresponding to the output voltage Ex of the effective value conversion circuit.

Hereupon, the voltage/current conversion circuit 44 is constituted for outputting an electric current, wherein absolute value of the outputted electric current is equal to the absolute value of the input voltage signal thereto. Namely, the circuit is configurated that in a relation between the output voltage Ex of the effective value conversion circuit and the output current Ib of the voltage/current conversion circuit 44, the absolute values of them are the same to each other and units of them are different from each other. For example, the configuration is that when the output voltage Ex of the effective value conversion circuit is 1V, the value of the output current Ib of the voltage/current conversion circuit 44 is converted to be 1μA.

Accordingly, the output voltage Ex (1V) of the effective value conversion circuit is converted to the output current Ib (1μA) by the voltage/current conversion circuit 44, and the capacitor 38 is charged by the output current Ib.

When a charged voltage E1 of the capacitor 38 is raised and becomes above an output voltage E2 which is output of a reference voltage setting circuit 42 and corresponds to the delayed time of the long time tripping operation, a comparator 41 outputs an output signal for the long time tripping operation. And the circuit breaker (not shown in the figure) operates the tripping operation with, for example, 100sec of time constant.

In case of applying the above-mentioned circuit breaker for the A.C. power line of 200A of rated current to another A.C. power line of 400A of the rated current, the reference voltage Ey of the reference voltage setting circuit 37 is changed to be set as 1V which is two times as large as 0.5V.

In such a case, in order to break an accidental overcurrent of 800A flowing on the A.C. power line whereto the above-mentioned circuit breaker is applied, the output voltage Ex of the effective value conversion circuit becomes 2V, which is two times as large as the reference voltage Ey because the reference voltage Ey of the reference voltage setting circuit 37 is 1V.

Accordingly, the output current Ib of the voltage/current conversion circuit 44 which is to be charged in the capacitor 38 becomes 2μA, that is two times as large as the value of the output current Ib (1μA), in case that the value of the rated current of the A.C. power line is 200A. Namely, the long time tripping operations of the long time tripping circuit 170 between the cases that the values of the rated current of the A.C. power line is 200A and 400A are largely different from each other.

For adjusting the above-mentioned difference, the time constant of the capacitor 38 is capable to be changed. However, the long tripping circuit 170 receives the output signal of the effective value conversion circuit as an effective value, and the effective value is in proportion to the square of an instant value of the accidental overcurrent. Therefore, it is very difficult to meet the change of the delayed times corresponding to the change of the value of the accidental overcurrent by adjusting the time constant of the capacitor 38.

Generally, the long time tripping operation of the circuit breaker is sufficient to be operated below 125% of the value of the rated current flowing on the A.C. power line. However, the conventional long time tripping circuit 170 has a disadvantage that the long time tripping operation is very difficult to be operated below 125% of the value of the rated current when the setting of the value of the rated current of the load break switch is changed without adjusting the time constant of the capacitor.

OBJECT AND SUMMARY OF THE INVENTION

Object of the present invention is to provide an improved circuit breaker wherein long time tripping operation can be operated below the value of rated current and with accuracy when setting of the value of the rated current flowing on a load break switch is changed.

A circuit breaker in accordance with the present invention comprises:

at least one load breaker switch provided on at least an A.C. power line;

at least one current transformer provided on the A.C. power line;

a peak value conversion circuit for converting an input signal thereto corresponding to a secondary current of the current transformer to a peak value;

an effective value conversion circuit for converting an input signal thereto corresponding to a secondary current of the current transformer to an effective value;

an instant time tripping circuit for outputting a trip signal when an input signal thereto corresponding to the secondary current of the current transformer is above a first predetermined value;

a short time tripping circuit for outputting a trip signal when an input of peak value from the peak value conversion circuit is above a second predetermined value;

a long time tripping circuit for outputting a trip signal when an input of effective value from the effective value conversion circuit is above a third predetermined value and having: at least a reference voltage setting circuit for setting a reference voltage corresponding to a value of rated current flowing on said A.C. power line; at least a comparator for comparing the effective value from the effective value conversion circuit and the reference voltage set by the reference voltage setting circuit; a processing circuit for calculating a ratio of the effective value and the reference voltage and outputting a voltage signal corresponding to the calculated ratio; and a voltage/current conversion circuit for converting the voltage signal from the processing circuit to a current output; and a tripping mechanism for opening the load break switch when the tripping signal from one of the instant time tripping circuit, the short time tripping circuit and the long time tripping circuit is outputted.

In the circuit breaker in accordance with the present invention, the processing circuit of the long time tripping circuit calculates a ratio $Z(=Ex/Ey)$ of the input voltages $Ex$ to $Ey$ which are input to respective input terminals of the comparator from the effective value conversion circuit and the reference voltage setting circuit and outputs a voltage signal $Ez$ corresponding to the ratio $Z$.

Accordingly, even when the value of the rated current acceptable to flow on an A.C. power line is changed, the voltage signal $Ez$ input to the voltage/current conversion circuit is not changed. Therefore, the output current of the voltage/current conversion circuit is not changed either. As a result, it is no need to change a time constant of a capacitor which defines a long time delay operation. By using the circuit breaker in accordance with the present invention, even when a value of the rated current flowing on the load break switch provided on the A.C. power line is changed, it is easy to operate the circuit breaker below the value of the rated current and accurate time delay is executed.

DESCRIPTION OF THE PREFERRED EMBODIMENTS

Figure 1:
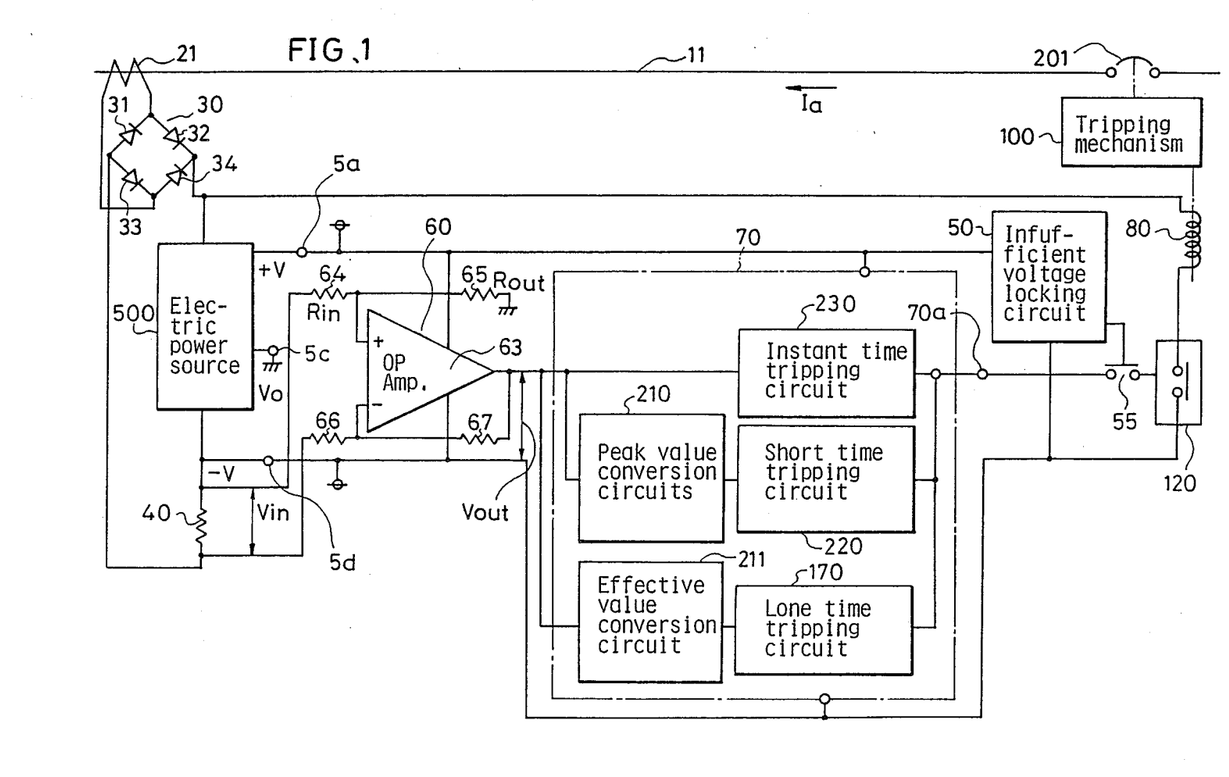
FIG. 1 is a circuit diagram showing a preferred embodiment of a circuit breaker in accordance with the present invention.
Figure 2:
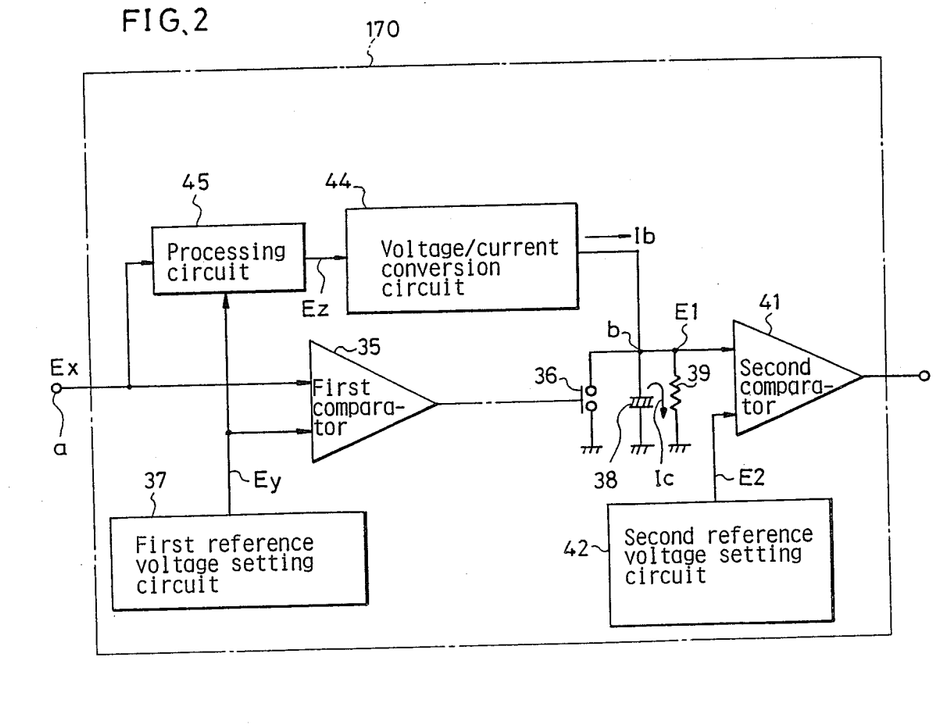
FIG. 2 is a circuit diagram showing a preferred embodiment of a long time tripping circuit of the circuit breaker shown in FIG. 1.
Figure 5:
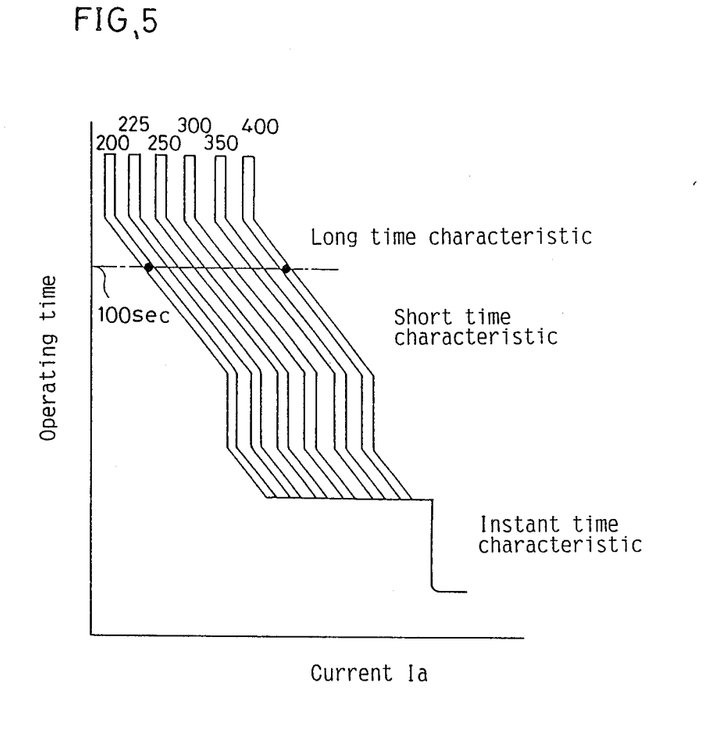
FIG. 5 is a drawing showing tripping characteristic of the circuit breaker in accordance with the present invention.

A preferred embodiment of a circuit breaker in accordance with the present invention is described referring to FIG. 1, FIG. 2 and FIG. 5.

FIG. 1 is a circuit diagram showing a circuit breaker in accordance with the present invention.

In FIG. 1, a current transformer 21 is provided on an A.C. power line 11. A rectifying circuit 30 is connected to secondary output terminals of the current transformer 21 for changing an alternating current flowing on secondary coil of the current transformer 21 to an unidirectional current. The rectifying circuit 30 consists of two sets of series circuits of diodes 31, 32 and 33, 34. An electric power source 500 for outputting a D.C. constant voltage is connected to a positive output terminal of the rectifying circuit 30. The electric power source 500 has a positive terminal 5a, a middle terminal 5c and a negative terminal 5d.

The negative terminal 5d of the electric power source 500 is connected to a terminal of a resistor 40. The other terminal of the resistor 40 is connected to a negative terminal of the rectifying circuit 30. The difference between potentials at both terminals of the resistor 40 is used for detecting the current value. An electric current having waveforms of full wave rectification and corresponding to a load current flowing on the A.C. power line 11 flows on the resistor 40.

A differential amplifying circuit 60 consists of an operational amplifier 63 and four resistors 64, 65, 66 and 67. Electric power is supplied to the differential amplifier 60 from the electric power source 500. Input terminals of the differential amplifying circuit 60 are respectively connected to both terminals of the resistor 40. The differential amplifying circuit 60 converts voltage drop of the resistor 40 for current detection to a voltage signal based on a middle voltage Vo of the electric power source 500.

A time delay circuit 70 comprises an instant time tripping circuit 230, a short time tripping circuit 220 and a long time tripping circuit 170. Respective output terminals of the instant time tripping circuit 230, the short time tripping circuit 220 and the long time tripping circuit 170 are connected commonly to an output terminal 70a of the time delay circuit 70.

Namely, the instant time tripping circuit 230 is connected to the output terminal of the differential amplifying circuit 60. And a series connection of a peak value conversion circuit 210 and the short time tripping circuit 220 and another series connection of an effective value conversion circuit 211 and the long time tripping circuit 170 are connected to the instant time tripping circuit 230 as parallel connection. The instant time tripping circuit 230 outputs a trip signal when the input signal thereto is above a first predetermined value. The short time tripping circuit 220 outputs a trip signal when the input of peak value from the peak value conversion circuit 210 is above a second predetermined value. And the long time tripping circuit 170 outputs a trip signal when the input of effective value from the effective value conversion circuit 211 is above a third predetermined value.

An electromagnetic tripping coil 80 is connected to a positive terminal of the amplifying circuit 30. A terminal of a switching circuit 120 is connected to the electromagnetic tripping coil 80 as series connection and the other terminal of the switching circuit 120 is connected to the negative terminal 5d of the electric power source 500. The electromagnetic tripping coil 80 is mechanically linked to the tripping mechanism 100 for opening a load break switch 201 provided on the A.C. power line 11 and is excited for driving the tripping mechanism 100 when the switching circuit 120 turns on.

An insufficient voltage operation locking circuit 50 for locking the tripping operation when the voltage of the electric power source 500 is insufficient (is below a predetermined voltage), is connected between the positive terminal 5a and the negative terminal 5d of the electric power source 500. An output switch 55 of the insufficient voltage operation locking circuit 50 is connected to the switching circuit 120.

FIG. 2 is a circuit diagram showing a preferred embodiment of the long time tripping circuit 170. In the figure, an input terminal of a first comparator 35 is connected to an input terminal "a" of the long time tripping circuit 170 for receiving an output voltage Ex from the effective value conversion circuit 211 (which is shown in FIG. 1 and not shown in FIG. 2). A switch 36 is connected to an output terminal of the first comparator 35. The switch 36 is normally closed and will be opened when overcurrent flows on the A.C. power line 11.

A first reference voltage setting circuit 37 is connected to the other input terminal of the first comparator 35, and the first reference voltage setting circuit 37 sets a value Ey corresponding to a value of the rated current flowing on the A.C. power line 11. The reference value Ey is used as a reference for comparing the output voltage Ex of the effective value conversion circuit 211 in the first comparator 35. A capacitor 38 for long time tripping operation is connected to the switch 36 as parallel connection. A resistor 39 is connected to the capacitor 38 as parallel connection for discharging the electric charge. A series connection of a processing circuit 45 and a voltage/current conversion circuit 44 is connected between the input terminal "a" of the long time tripping circuit 170 and a non-earthed end "b" of the capacitor 38 and the resistor 39.

The processing circuit 45 calculates a ratio of the input voltages Ex to Ey applied to both input terminals of the first comparator 35 as shown in the following equation (1), and outputs a voltage Ez corresponding to the ratio Z:

$$Z = Ex/Ey \qquad (1).$$

A second comparator 41 is for defining a time delay of the long time tripping operation, and an input terminal thereof is connected to the terminal "b" for receiving a charged voltage E1 of the capacitor 38 for the long time tripping. A second reference voltage setting circuit 42 is connected to the output input terminal of the second comparator 41, and the second reference voltage setting circuit 42 defines a reference voltage E2 which corresponds to a time of the long time delay applied to the second comparator 41.

Operation of the above-mentioned circuit is described in the following.

When a current Ia flows on the A.C. power line 11 of FIG. 1, a secondary alternating electric current having a value defined by the ratio of current transformation flows on a secondary winding of the current transformer 21. The secondary alternating electric current is converted to an unidirectional electric current by the rectifying current 30. The output current of the rectifying circuit 30 flows through the electric power source 500 and the resistor 40 and circulates to the rectifying circuit 30. At this time, a current having waveforms of full wave rectification corresponding to the current Ia flowing on the A.C. power line 11 flows on the electric power source 500 and the resistor 40.

When the current having waveforms of full wave rectification flows in the electric power source 500, positive and negative voltages $+V$ and $-V$ referring to the voltage Vo on the middle terminal 5C are outputted on the positive and negative terminals 5a and 5d.

On the other hand, an electric power of the differential amplifying circuit 60 is supplied from the electric power source 500 and input voltages of the differential amplifying circuit 60 are supplied from the resistor 40. Gain "A" of the differential amplifying circuit 60 is defined by the following equation:

$$A = \frac{V\text{out}}{V\text{in}} = \frac{R\text{out}}{R\text{in}}. \qquad (2)$$

An output of the differential amplifying circuit 60 is applied to the instant time tripping circuit 230, the short time tripping circuit 220 and the long time tripping circuit 170 of the time delay circuit. Respective circuits 230, 220 and 170 issue an output signal for executing instant time characteristic, short time characteristic and long time characteristic shown in FIG. 5.

The long time trip operation under the long time characteristic is described. The output voltage Ex of the effective value conversion circuit 211 in the time delay circuit 70 is input to the first comparator 35 of the long time tripping circuit 170 shown in FIG. 2. When the output voltage Ex reaches to a value, for example, two times as large as the reference voltage Ey set by the first reference voltage setting circuit 37, the output switch 36 connected to the first comparator 35 turns off from ON state, and the capacitor 38 becomes capable to be charged.

It is provided that value of the rated current of the current Ia flowing on the alternating electric power line 11 is set as, for example, 200A and the reference value Ey is set as 0.5V by the first reference voltage setting circuit 37. When the output voltage Ex from the effective value conversion circuit 211 reaches to 1V which is two times as large as the reference voltage Ey, the output switch 36 connected to the first comparator 35 turns off from ON state and the capacitor 38 becomes to be charged. The value of the accidental overcurrent Ia flowing on the alternating electric power line 11 at the start of charging of the capacitor 38 is 400A.

On the other hand, the ratio of the voltages Ex to Ey as shown by the above-mentioned equation (1), which are applied to both terminals of the first comparator 35, is calculated by the processing circuit 45. And the processing circuit 45 outputs a voltage Ez corresponding to the ratio Z. Namely, the output voltage Ez of the processing unit 45 is shown by the following equation (3):

$$Ez = 1/0.5 = 2 \text{ V} \tag{3}$$

Hereupon, the voltage/current conversion circuit 44 is constituted for making the absolute values of the input signal (voltage Ez) and output signal (current Ib) be the same each other and the units of them are different from each other. Therefore, the input voltage Ez (2V) is converted to the output current Ib (2μA) by the voltage/current conversion circuit 44.

When the output current Ib is charged in the capacitor 38 and the charged voltage E1 thereof is raised and becomes above the output voltage E2 of the second reference voltage setting circuit 42 for long time tripping operation, the second comparator 41 of the long time tripping circuit 170 issues an output signal to the terminal 70a of the time delay circuit 70 shown in FIG. 1 as an output of the long time delay.

The output signal of the time delay circuit 70 passes the output swtich 55 of the insufficient voltage operation locking circuit 50 and triggers the switching circuit 120 to produce an input. Thereby, the switching circuit 120 is turned on and the electromagnetic tripping coil 80 is excited. When the electromagnetic tripping coil 80 is excited, the load break switch 201 which is linked to the electromagnetic tripping coil 80 by the tripping mechanism 100 shown in FIG. 1 is opened for breaking the accidental overcurrent with delay time of, for example, 100 sec from the start of detection of the overcurrent.

Next, when the above-mentioned circuit breaker wherein, at first, the value of the rated current is set as 200A is applied to another A.C. power line wherein the value of the rated current is set as 400A, the reference voltage Ey set by the first reference voltage setting circuit 37 must be changed to 1V which is two times as large as 0.5V.

Under such a condition, when an accidental overcurrent of 800A flows on the A.C. power line 11, the output voltage Ex from the effective value conversion circuit 211 becomees 2V. As the reference voltage Ey is set as 1V by the first reference voltage setting circuit 37, the output voltage Ez of the processing circuit 45 is given by the following equation (4) which is similar to the equation (3):

$$Ez = 2/1 = 2 \text{ V} \tag{4}$$

Accordingly, the output current Ib of the voltage/current conversion circuit 44 which is for charging the capacitor 38 becomes 2μA and similar to that of the case of 200A of the rated current, and even when the rated current is 400A, the long time tripping operation can be executed with time delay of 100sec from the start of the detection of the accidental overcurrent.

By the way, when the value of the current flowing on the load break switch 21 is smaller as 10–20% of the value of the rated current thereof, the electric power source 500 may output insufficient voltage for driving the time delay circuit 70. Under such a condition that the insufficient voltage state is outputted, the output switch 55 of the insufficient voltage operation locking circuit 50 turns off to prevent the switching on of the switching circuit 120 even when the time delay circuit 70 outputs an erroneous output.

Figure 3:
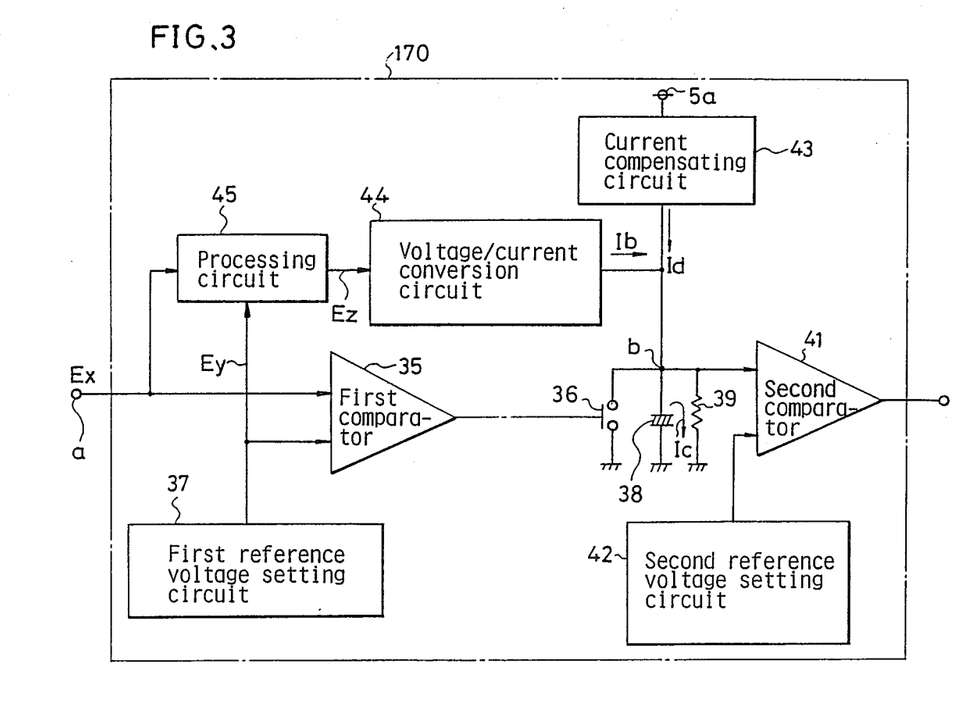
FIG. 3 and FIG. 4 are circuit diagrams respectively showing other preferred embodiments of the long time tripping circuit of the circuit breaker in accordance with the present invention.

FIG. 3 shows another preferred embodiment of the long time tripping circuit 170. Elements designated by the same numerals as the above-mentioned embodiment are similar or substantially the same. In the figure, numeral 43 designates a current compensating circuit. Generally, when the apparent electric current Ib corresponding to the accidental overcurrent is charged in the capacitor 38, the electric current leaks through the resistor 39 little by little. The current compensating circuit 43 supplements a compensating circuit Id corresponding to the leakage current Ic.

Generally, the long time tripping circuit 170 is designed to be operated when the value of the electric current Ia flowing on the load break switch 201 is below 125% of the rated current thereof. In this embodiment, the current compensating circuit 43, however, is disposed on the long time tripping circuit 170, and leakage current Ic leaking through the resistor 39 is compensated. Therefore, more precise time delay of the long time tripping circuit 170 can be achieved.

Figure 4:
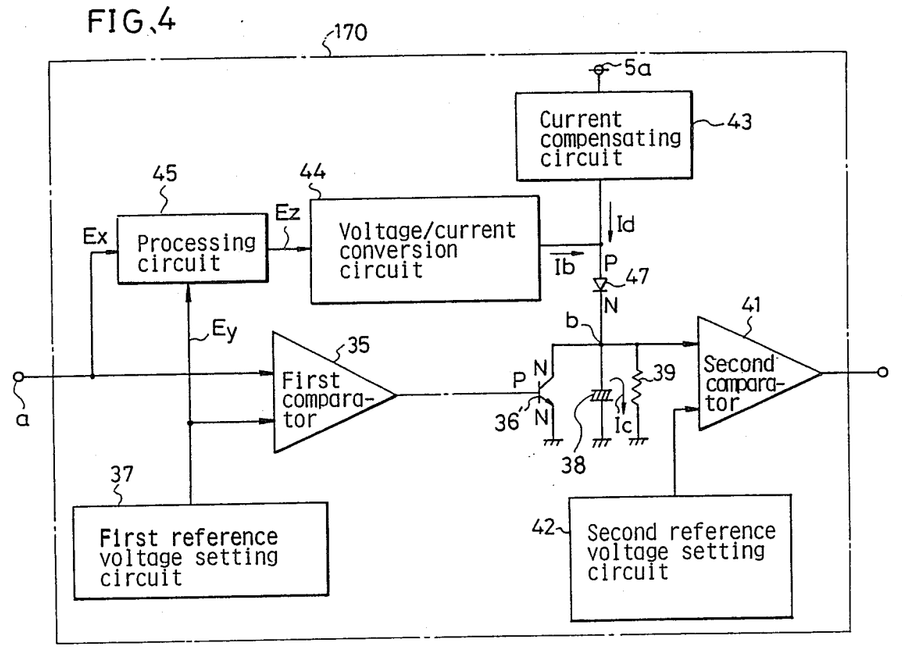

FIG. 4 shows still other preferred embodiment of the long time tripping circuit 170. Elements designated by the same numerals as the above-mentioned embodiments are similar or substantially the same ones and the substantially the same description apply. In the figure, a semiconductor switching device 36' is replaced to the mechanical contact of the output switch 36 connected to the first comparator 35. Furthermore, a diode 47 for preventing the reflux of the current is provided between the current compensating circuit 43 and the capacitor 38. In this case, a PNP type transistor and a PN type diode are suitable to be used for the transistor 36' and the diode 47. Thereby, the leakage of current leaking from the capacitor 38 to other circuits by passing through the above-said elements, can effectively be cut off. In the above-mentioned embodiments, the relation between the absolute values of the input voltage Ez and output current Ib of the voltage/current conversion circuit 44 is designed be a constant ratio. However, it may be designed the voltage/current conversion circuit so as to output the output current Ib increasing as the value of the input voltage Ez increases.

Furthermore, the A.C. power line 11 of the circuit breakers described in the above-mentioned embodiments are shown as single phase for simplicity of description. Of course, the circuit breaker in accordance with the present invention, however, can be applied to multi-phase A.C. power lines.

Although the invention has been described in its preferred form with a certain degree of particularity, it is understood that the present disclosure of the preferred form has been changed in the details of construction and the combination and arrangement of parts may be resorted to without departing from the spirit and scope of the invention as hereinafter claimed.

What is claimed is:

1. A circuit breaker comprising:
   at least one load break switch provided on at least an A.C. power line;
   at least one current transformer provided on said A.C. power line;
   a peak value conversion circuit for converting an input signal thereto corresponding to a secondary current of said current transformer to a peak value;
   an effective value conversion circuit for converting an input signal thereto corresponding to a secondary current of said current transformer to an effective value;
   an instant time tripping circuit for outputting a trip signal when an input signal thereto corresponding to said secondary current of said current transformer is above a first predetermined value;
   a short time tripping circuit for outputting a trip signal when an input of peak value from said peak value conversion circuit is above a second predetermined value;
   a long time tripping circuit for outputting a trip signal when an input of effective value from said effective value conversion circuit is above a third predetermined value, and having: at least a reference voltage setting circuit for setting a reference voltage corresponding to a value of rated current flowing on said A.C. power line; at least a comparator for comparing said effective value from said effective value conversion circuit and said reference voltage set by the reference voltage setting circuit; a processing circuit for calculating a ratio of said effective value and said reference voiltage and outputting a voltage signal corresponding to said calculated ratio; and a voltage/current conversion circuit for converting said voltage signal from said processing circuit to a current output; and
   a tripping mechanism for opening said load break switch when said tripping signal from one of said instant time tripping circuit, said short time tripping circuit and said long time tripping circuit is outputted.

2. A circuit breaker in accordance with claim 1, wherein
   absolute values of an input voltage and an output current of said voltage/current conversion circuit of said long time tripping circuit are equal to each other or in relation of at least constant ratio.

3. A circuit breaker comprising:
   at least one load break switch provided on at least an A.C. power line for opening and closing a load;
   at least one current transformer for detecting value of current flowing in said load break switch;
   a rectifying circuit connected to secondary coil of said current transformer and converting secondary output of alternating current of said current transformer to an unidirectional current;
   an electric power source for outputting D.C. constant voltage and connected between both of output terminals of said rectifying circuit;
   a resistor connected between said rectifying circuit and said electric power source for detecting a current value in proportion to said unidirectional current;
   a differential amplifying circuit connected to both terminals of said resistor for amplifying voltage drop by said resistor;
   a time delay circuit for making predetermined delay times corresponding to a value of said current flowing in one direction;
   a switching circuit controlled to be opened and closed by output signal from said time delay circuit;
   an electromagnetic tripping coil being excited when said switching circuit is closed; and
   a tripping mechanism driven by electromagnetic force of said electromagnetic tripping coil for opening and closing said load break switch;
   said time delay circuit further comprising:
   an effective value conversion circuit for converting an input signal from said differential amplifying circuit to an effective voltage thereof;
   a first reference voltage setting circuit for setting reference voltage corresponding to reference value of rated current flowing on said electric power line;
   a first comparator for comparing outputs from said effective value conversion circuit and said reference voltage set by said first reference voltage setting circuit for judging whether accidental overcurrent flows or not;
   a processing circuit for calculating a ratio of said effective value to said reference voltage and outputting a voltage output corresponding to said ratio;
   a voltage/current conversion circuit for converting said voltage output from said processing circuit to a current output;
   a capacitor to be charged by said current output from said voltage/current conversion circuit corresponding to value of said accidental overcurrent;
   a resistor connected to said capacitor as parallel connection for discharging charge of said capacitor;
   a switch of said first comparator connected to said capacitor as parallel connection, which is normally closed and turns off to open when said comparator judges that an accidental overcurrent flows;
   a second reference voltage setting circuit for setting a voltage corresponding to a reference of delay time of long time tripping operation; and
   a second comparator comparing charged voltage of said capacitor and output voltage of said second reference time setting circuit for determining said delay time of long time tripping operation.

4. A circuit breaker in accordance with claim 3, wherein
   said time delay circuit further comprising a current compensating circuit connected to said capacitor for compensating a leakage current leaking through said resistor connected to said capacitor.

5. A circuit breaker in accordance with claim 4, wherein
   said switch of said first comparator in said time delay circuit is a transistor.

6. A circuit breaker in accordance with claim 4 or 5, wherein
   said time delay circuit further comprising a diode connected between said current compensating circuit and said capacitor for preventing reflux of current to said current compensating circuit.

* * * * *